United States Patent

Ohashi

Patent Number: 5,930,056
Date of Patent: Jul. 27, 1999

[54] GAUSS LENS

[75] Inventor: Kazuyasu Ohashi, Funabashi, Japan

[73] Assignee: Ricoh Company, Ltd, Tokyo, Japan

[21] Appl. No.: 09/074,359

[22] Filed: May 7, 1998

[30] Foreign Application Priority Data

May 7, 1999 [JP] Japan ..................................... 9-117170

[51] Int. Cl.⁶ ................ G02B 9/36; G02B 9/60
[52] U.S. Cl. .................. 359/776; 359/663; 359/740
[58] Field of Search .................... 359/775, 776, 359/663, 740

[56] References Cited

U.S. PATENT DOCUMENTS

| | | | |
|---|---|---|---|
| 2,401,324 | 6/1946 | Altman | 359/776 |
| 2,983,193 | 5/1961 | Schade | 359/776 |
| 3,136,840 | 6/1964 | Buzawa | 359/776 |
| 3,601,472 | 8/1971 | Gilkeson et al. | 359/776 |
| 4,377,326 | 3/1983 | Kobayashi | 359/776 |
| 4,671,627 | 6/1987 | Shinohara | 359/776 |
| 4,784,480 | 11/1988 | Yokota et al. | 359/776 |
| 5,285,319 | 2/1994 | Kanoshima | 359/775 |

FOREIGN PATENT DOCUMENTS

| | | | |
|---|---|---|---|
| 2343577 | 3/1974 | Germany | 359/776 |
| 38-11585 | 7/1963 | Japan | 359/776 |
| 57-86812 | 5/1982 | Japan | 359/776 |
| 59-61813 | 4/1984 | Japan | 359/776 |
| 60-181716 | 9/1985 | Japan | 359/775 |
| 62-47019 | 2/1987 | Japan | 359/776 |
| 2-256013 | 10/1990 | Japan . | |
| 5-113535 | 5/1993 | Japan | 359/776 |

Primary Examiner—Georgia Epps
Assistant Examiner—Evelyn A. Lester
Attorney, Agent, or Firm—Graham & James LLP

[57] ABSTRACT

A Gauss lens achieves a high reading density when used with an imaging magnification of about 0.16535 and reduces the cost while providing a sufficient angle of view and brightness. The Gauss lens includes: a first lens group including a first lens having a positive meniscus shape; a second lens group including a second lens having a positive meniscus shape and a third lens having a negative meniscus shape, the second and third lenses being connected with each other; a third lens group including a fourth lens having a negative meniscus shape and a fifth lens having a positive meniscus shape, the fourth and fifth lenses being connected with each other; and a fourth lens group including a sixth lens having a positive meniscus shape, wherein the following conditions are satisfied:

(1) $n_2 < 1.53$, (2) $v_2 < 66.0$, (3) $n_3 < 1.63$, (4) $v_3 < 38.0$, (5) $25.0 < v_2 - v_3 < 35.0$, (6) $0.30 < (R_3 + R_5)/R_4 < 0.60$, (7) $0.24 < (D_5 + D_6)/f < 0.28$, (8) $0.80 < f_1/f < 0.87$, (9) $0.77 < f_4/f < 0.84$.

24 Claims, 2 Drawing Sheets

GAUSS LENS

BACKGROUND OF THE INVENTION

1. Field of the Invention

The present invention relates to a reading lens, more specifically, to a lens, a lens system and an image scanning apparatus including such lens and provided in a manuscript reading unit of a facsimile machine, a digital copier, various image scanners or similar devices.

2. Description of Related Art

Although conventional manuscript reading units provided in a facsimile machine, a digital copier, an image scanner or similar devices has a reading density of 200–400 dots per inch ("dpi"), recent demand for greatly improved image quality requires that such a manuscript reading unit have a higher reading density. It is expected that an increase in reading density would provide a desired amount of improvement of image resolution, a reduction of moiré and other image-related improvements.

In currently available manuscript reading units provided in a facsimile machine, a digital copier or similar device, a minimum size of a pixel of a CCD (Charge Coupled Device) is about 7 μm. In such a manuscript reading unit, a reading lens requires a resolution and a contrast for a field spatial frequency as high as 71.4 lines/mm. Furthermore, when an attempt to increase the reading density is made without changing the size of the pixel of the CCD, it is necessary to increase an imaging magnification. For example, although the imaging magnification is 0.11024 when the reading density is 400 dpi, the increase of the reading density to 600 dpi results in the imaging magnification being increased to 0.16535. Although the varying imaging magnification naturally requires a change in the design of the reading lens, the higher magnification is disadvantageous to a correction of aberration. Moreover, the reading lens is required to have a wide angle of view which is capable of reducing a conjugate length (a distance between an object and an image) to achieve a reduction in size and miniaturization of an apparatus including such reading lens and manuscript reading unit. The reading lens is also required to have a large aperture for high-speed reading. Of course, a low cost for the reading lens and manuscript reading unit are also required. These are common requirements for a reading lens regardless of the reading density.

Since most of the known reading lenses have been designed for a reading density of 400 dpi or less, when such conventional reading lenses are used with a reading density of 600 dpi by changing the imaging magnification, a sufficient imaging performance cannot be achieved.

An example of such a conventional reading lens which is designed so that it may be used with the imaging magnification of about 0.16535 is disclosed in Japanese Patent Application Laid-open No. 2-256013. The reading lens described therein is designed so that it may be used with an imaging magnification of about 0.16535. However, since any glass material for use in this reading lens has a refractive index of 1.75 or more and is therefore relatively expensive, the reading lens described in Japanese Patent Application Laid-open No. 2-256013 cannot provide a low cost reading lens or manuscript reading unit. In addition, this reading lens does not have a desired high level of brightness and angle of view.

SUMMARY OF THE INVENTION

To overcome the problems described above, preferred embodiments of the present invention provide a Gauss lens which solves the above problems and is constructed to provide a sufficient angle of view and brightness, a high reading density, such as, for example, about 600 dpi when a size of a pixel of CCD is about 7 μm, when the reading lens is used with an imaging magnification of about 0.16535 and a low cost.

In order to solve the above problems, according to the first aspect of preferred embodiments of the present invention, there is provided a Gauss lens which includes: a first lens group having a positive refracting power; a second lens group having a negative refracting power; a diaphragm; a third lens group having a negative refracting power; and a fourth lens group having a positive refracting power, the first lens group, the second lens group, the diaphragm, the third lens group and the fourth lens group being arranged in this order from the side of an object, the first lens group including a first lens having a positive meniscus shape and including a convex surface which is directed toward the object, the second lens group including a second lens having a positive meniscus shape and including a convex surface which is directed toward the object; and a third lens having a negative meniscus shape and including a concave surface which is directed toward an image, the second lens and the third lens being connected to each other, the third lens group including a fourth lens having a negative meniscus shape and including a concave surface which is directed toward the object; and a fifth lens having a positive meniscus shape and including a convex surface which is directed toward the image, the fourth lens and the fifth lens being connected to each other, and the fourth lens group including a sixth lens having a positive meniscus shape and including a convex surface which is directed toward the image, wherein-assuming that $n_2$ denotes a refractive index of the second lens, $n_3$ denotes the refractive index of the third lens, $v_2$ denotes an Abbe number of the second lens, $v_3$ denotes the Abbe number of the third lens, $R_3$ denotes a radius of curvature of the surface of the second lens on the side of the object, $R_4$ denotes the radius of curvature of the surface of the second lens on the side of the image (the surface of the third lens on the side of the object), $R_5$ denotes the radius of curvature of the surface of the third lens on the side of the image, $D_5$ denotes an air space between the surface of the third lens on the side of the image and the diaphragm, $D_6$ denotes the air space between the diaphragm and the surface of the fourth lens on the side of the object, f denotes a focal length of a whole lens system, $f_1$ denotes the focal length of the first lens group, and $f_4$ denotes the focal length of the fourth lens group, the following conditions (1) through (9) are preferably satisfied:

$$n_2 < 1.53, \tag{1}$$

$$v_2 < 66.0, \tag{2}$$

$$n_3 < 1.63, \tag{3}$$

$$v_3 < 38.0, \tag{4}$$

$$25.0 < v_2 - v_3 < 35.0, \tag{5}$$

$$0.30 < (R_3 + R_5)/R_4 < 0.60, \tag{6}$$

$$0.24 < (D_5 + D_6)/f < 0.28, \tag{7}$$

$$0.80 < f_1/f < 0.87, \tag{8}$$

$$0.77 < f_4/f < 0.84. \tag{9}$$

In order to solve the problems described in the description of related art above, according to a second aspect of preferred embodiments of the present invention, the Gauss lens according to the first aspect of preferred embodiments of the present invention is constructed such that, assuming that $n_4$ denotes the refractive index of the fourth lens, $n_5$ denotes the refractive index of the fifth lens, $n_6$ denotes the refractive index of the sixth lens, $v_4$ denotes the Abbe number of the fourth lens, $v_5$ denotes the Abbe number of the fifth lens, $v_6$ denotes the Abbe number of the sixth lens, $R_7$ denotes the radius of curvature of the surface of the fourth lens on the side of the object, $R_8$ denotes the radius of curvature of the surface of the fourth lens on the side of the image (the surface of the fifth lens on the side of the object), and $R_9$ denotes the radius of curvature of the surface of the fifth lens on the side of the image, the following conditions (10) through (13) are preferably satisfied:

$$(n_5+n_6)/2 < 1.75 \quad (10)$$

$$0.00 < (n_5+n_6)/2 - n_4 < 0.05 \quad (11)$$

$$20.0 < (v_5+v_6)/2 - v_4 < 25.0 \quad (12)$$

$$1.00 < (R_7+R_9)/R_8 < 1.30 \quad (13)$$

In order to solve the above-described problems with conventional reading lenses, according to a third aspect of preferred embodiments of the present invention, the Gauss lens according to the first or second aspect of preferred embodiments of the present invention is constructed such that, assuming that $D_3$ denotes a center thickness of the second lens, $D_4$ denotes a center thickness of the third lens, $D_7$ denotes a center thickness of the fourth lens, and $D_8$ denotes a center thickness of the fifth lens, the following conditions (14) and (15) are preferably satisfied:

$$1.55 < (R_5+|R_7|)/(D_5+D_6) < 1.65 \quad (14)$$

$$1.28 < (R_3+|R_9|)/(D_3+D_4+D_5+D_6+D_7+D_8) < 1.40 \quad (15)$$

In order to solve the above-described problems with conventional reading lenses, according to a fourth aspect of preferred embodiments of the present invention, the Gauss lens according to the first, second or third aspect of preferred embodiments of the present invention is constructed such that, assuming that $f_{12}$ denotes a synthetic focal length of the first lens group and the lens second group, and $f_{34}$ denotes the synthetic focal length of the third lens group and the fourth lens group, the following conditions (16) and (17) are preferably satisfied:

$$1.50 < f_{12}/f < 1.60 \quad (16)$$

$$1.05 < f_{34}/f < 1.15 \quad (17)$$

In order to solve the above-described problems with conventional reading lenses, according to a fifth aspect of preferred embodiments of the present invention, the Gauss lens according to the first, second third, or fourth aspect of preferred embodiments of the present invention is constructed such that, the following condition (18) is preferably satisfied:

$$0.60 < D_5/D_6 < 0.70 \quad (18)$$

These and other elements, features and advantages of the preferred embodiments of the present invention will be apparent from the following detailed description of the preferred embodiments of the present invention, as illustrated in the accompanying drawings, wherein like reference numerals indicate like elements to avoid repetition.

DETAILED DESCRIPTION OF PREFERRED EMBODIMENTS

Figure 1:
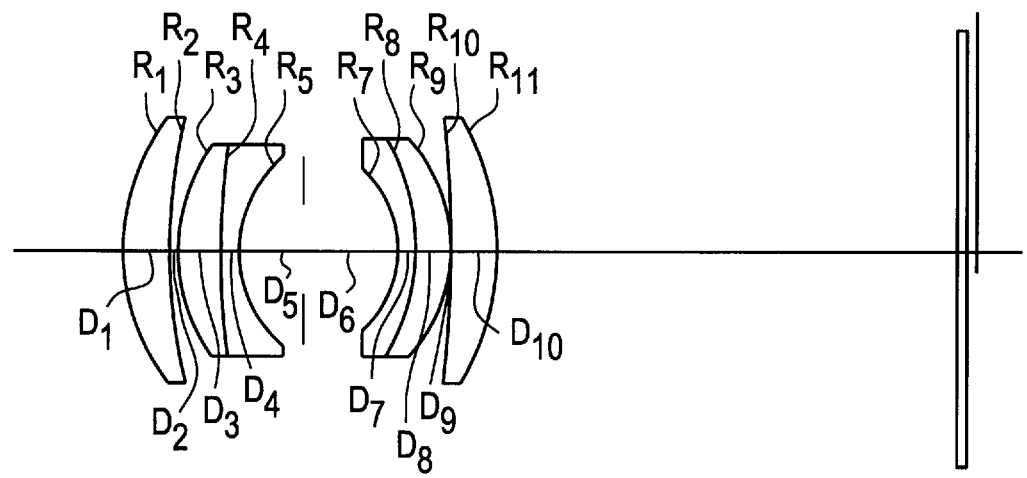
FIG. 1 shows an optical arrangement showing a constitution of a Gauss lens according to preferred embodiments of the present invention.

Preferred embodiments of a Gauss lens according to the present invention will be described below with reference to the accompanying drawings.

Although the Gauss lens of preferred embodiments of the present invention is preferably a typical Gauss type comprising four lens groups and six components, the second and third lenses are specifically made of a low-priced glass material whereby the cost of the inventive Gauss lens is reduced, and the desired conditions, described above, are also satisfied so as to achieve a significantly increased reading density. Thus, the preferred embodiments of the present invention provide a low cost reading lens which achieves a very high reading density.

The conditional expressions (1) through (4) define the refractive index and Abbe number of the second and third lenses. Although the glass materials meeting these conditional expressions are low in price, the glass materials used for the second and third lenses preferably have both a sufficient reduction of Petzval sum and a sufficient correction of on-axis color aberration and magnification color aberration depending on the combination thereof, whereby an excellent imaging performance is achieved.

The conditional expression (5) defines a difference between the Abbe numbers of the second and third lenses. It has been discovered that excellent and sufficient correction of the on-axis color aberration cannot be achieved outside of a range of conditional expression (5). Thus, if conditional expression (5) is not achieved, it is difficult to accomplish the desired high reading density.

The conditional expression (6) relatively defines a power of a connection surface of the second lens group which includes a connected lens. When the conditional expressions (1) through (5) are satisfied, if the power exceeds an upper limit of the conditional expression (6), the on-axis color aberration is deteriorated, while if the power is less than a lower limit, the magnification color aberration is deteriorated. Therefore, in order to excellently correct the on-axis color aberration and the magnification color aberration, all the conditional expressions (1) through (6) are preferably satisfied.

The conditional expression (7) defines the space between the second and third lens groups. If the space exceeds the upper limit of the conditional expression (7), an astigmatic difference is increased. If the space is less than the lower limit, a curvature of the sagittal field is higher. In either case, the field lacks flatness, which results in a deterioration of off-axis performance.

The conditional expressions (8) and (9) define the refracting power of the first and fourth lens groups. In order to have both a miniaturization of the lens and the reduction of comatic aberration, these conditional expressions are preferably satisfied. If the refracting power of the first lens group (or the fourth lens group) becomes lower causing $f_1$ (or $f_4$) to be increased such that the expression $f_1/f$ (or $f_4/f$) is above the upper limit of the conditional expression (8) (or the conditional expression (9)), the lens size is too large and the cost is thus increased. If the refracting power of the first lens group (or the fourth lens group) becomes higher causing $f_1$ (or $f_4$) to decrease such that the expression $f_1/f$ (or $f_4/f$) is below the lower limit of the conditional expression (8) (or the conditional expression (9)), the comatic aberration becomes higher and the imaging performance is thus deteriorated.

The conditional expressions (1) through (9) are preferably satisfied simultaneously by a reading lens according to preferred embodiments of the present invention, whereby the Gauss lens according to preferred embodiments of the present invention achieves high density and low cost.

In addition, there are more desirable conditions for obtaining the higher imaging performance in the Gauss lens according to further preferred embodiments of the present invention. The conditional expressions (10) through (12) define the refractive index and Abbe number of the lenses (the third, fourth and fifth lenses) positioned closer to the image than the diaphragm. A satisfaction of the conditional expression (10) defines that relatively low-priced glass * material is used for the fourth, fifth or sixth lenses, and preferably each of the fourth, fifth and sixth lenses. When the conditional expression (10) is satisfied, in order to achieve both sufficient reduction of Petzval sum and sufficient correction of on-axis color aberration and magnification color aberration, it is desirable that the conditional expressions (11) and (12) are satisfied.

The conditional expression (13) relatively defines the power of the connection surface of the third lens group which includes a connection lens. When the conditional expressions (10) through (12) are satisfied, if the power exceeds the upper limit of the conditional expression (13), the on-axis color aberration is deteriorated, while if the power is less than the lower limit, the magnification color aberration is deteriorated.

The conditional expression (14) defines a concentricity of the image-side surface of the third lens and the object-side surface of the fourth lens, where the third and fourth lenses are opposite to each other so that the diaphragm may be located therebetween. Above the upper limit of the conditional expression (14), a spherical aberration is increased in a negative direction which often causes the deterioration of a contrast. Below the lower limit of conditional expression (14), the comatic aberration is increased which often causes the deterioration of off-axis performance.

The conditional expression (15) defines the concentricity of the object-side surface of the second lens and the image-side surface of the fifth lens. Above the upper limit of the conditional expression (15), the spherical aberration is decreased so as to be too small or to appear in a positive direction, which often results in imbalance on the field. Below the lower limit of conditional expression (15), the comatic aberration is increased such that the off-axis performance is degraded.

The conditional expressions (16) and (17) define the refracting power of the lens group positioned closer to the object than the diaphragm and the refracting power of the lens group positioned closer to the image than the diaphragm. When the Gauss lens according to preferred embodiments of the present invention is used with the imaging magnification of about 0.165, in order to excellently correct a distortion aberration, it is desirable that these conditional expressions are satisfied. Above the upper limit of the conditional expression (16) or below the lower limit of the conditional expression (17), a negative distortion aberration is increased, while below the lower limit of the conditional expression (16) or above the upper limit of the conditional expression (17), a positive distortion aberration is increased.

The conditional expression (18) defines a ratio of the distance from the image-side surface of the third lens to the diaphragm, to the distance from the diaphragm to the object-side surface of the fourth lens. When the Gauss lens according to preferred embodiments of the present invention is used with the imaging magnification of about 0.165, in order to reduce an outer diameter of the lens, it is desirable that these conditions are satisfied. Above the upper limit of the conditional expression (18), the lens closer to the object than the diaphragm becomes too large, while below the lower limit, the lens closer to the image than the diaphragm becomes too large. Thus, a lens having characteristics which are outside of the conditional expression (18) would prevent the lens from being as small as possible along the optical axis.

When the Gauss lens according to preferred embodiments of the present invention is used with the imaging magnification of about 0.165, the Gauss lens achieves the best possible performance. The Gauss lens is preferably used in combination with a CCD which includes a pixel size of about 7 $\mu$m, whereby a manuscript of 304.8 mm in width can be read with a resolution of 600 dpi.

In the construction and arrangement of the preferred embodiments of the Gauss lens, an aberration is sufficiently corrected, and the Gauss lens has a very high quality imaging performance. Definitions of reference symbols shown in the preferred embodiments are as follows:

F/No.: F number $F_e$: Focal length m: Imaging magnification

Y: Height of a maximum object w: Half angle of view

R: Radius of curvature

D: Distance between surfaces $N_d$: Refractive index $\nu_d$: Abbe number

Figure 2:
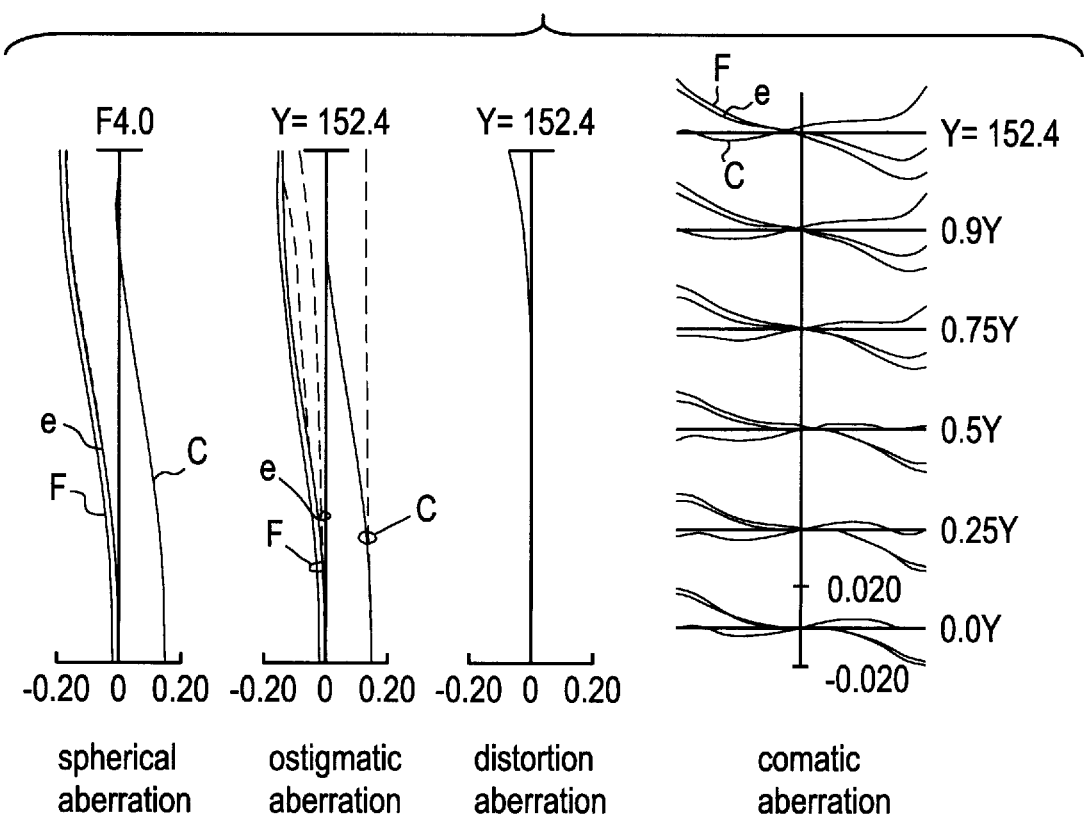
FIG. 2 shows various aberrations of the Gauss lens according to a preferred embodiment of the present invention.
Figure 3:
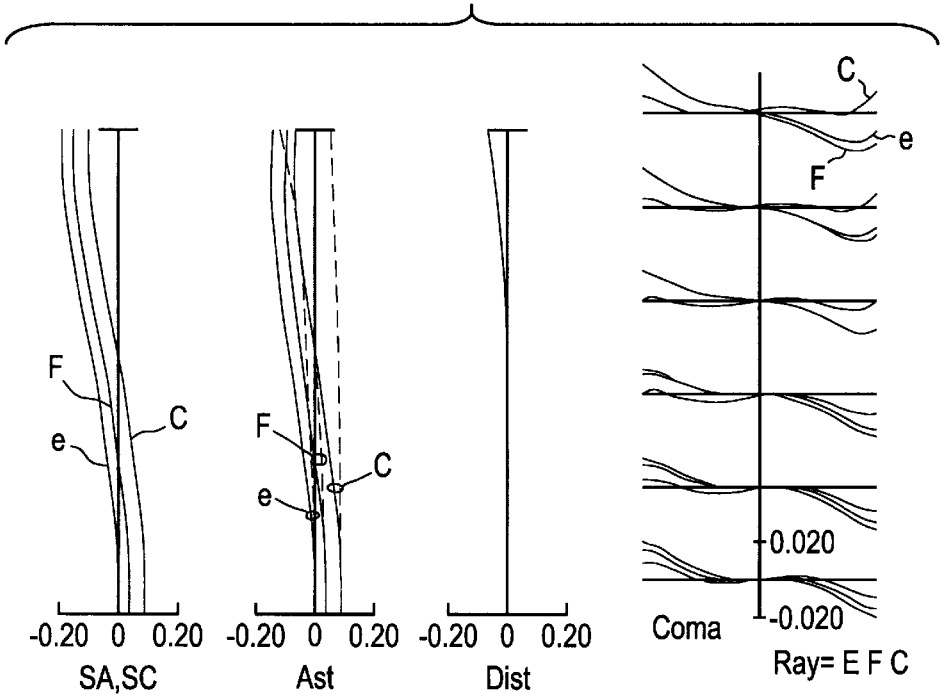
FIG. 3 shows various aberrations of the Gauss lens according to another preferred embodiment of the present invention.
Figure 4:
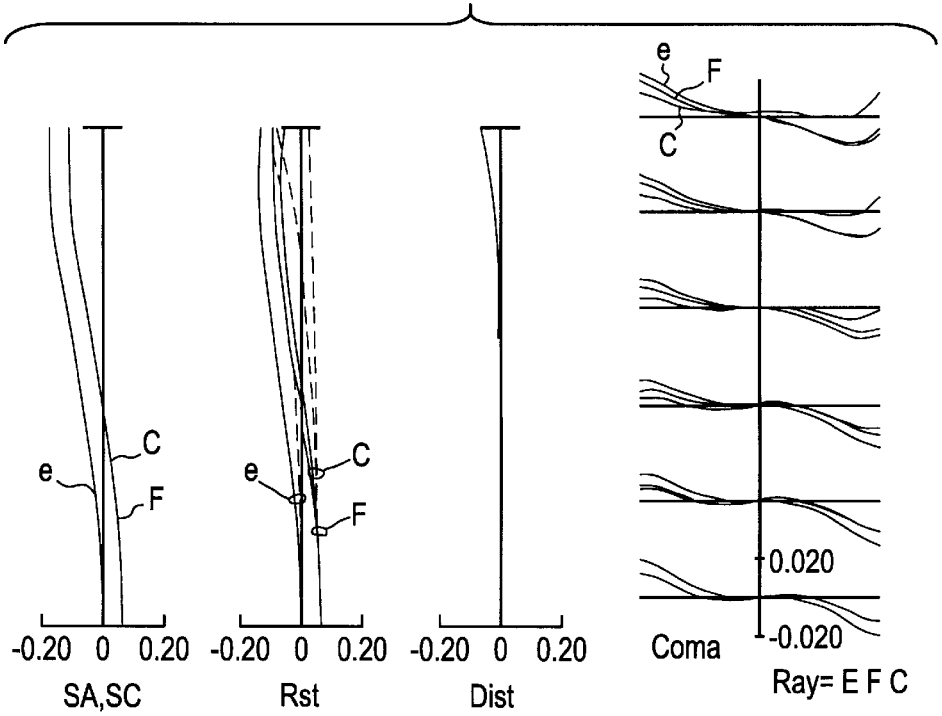
FIG. 4 shows various aberrations of the Gauss lens according to a further preferred embodiment of the present invention.

A spherical aberration is shown by a solid line and a sine condition is shown by a dotted line in FIGS. 2–4. For an astigmatism, a sagittal ray is shown by the solid line and a meridional ray is shown by the dotted line in FIGS. 2–4.

The following rays are shown in the drawing of the aberration, where

E denotes an e line (546.07 nm),

C denotes a C line (656.27 nm), and

F denotes an F line (486.13 nm).

Preferred Embodiment 1

F/No.=4.0

$F_e$=68.1 mm m=0.16535

Y=152.4 mm w=17.6°

| Surface number | R | D | $N_d$ | $v_d$ | Note |
|---|---|---|---|---|---|
| 1 | 27.023 | 5.19 | 1.72000 | 50.25 | First lens (First group) |
| 2 | 73.912 | 0.86 | | | |
| 3 | 21.956 | 5.06 | 1.51633 | 64.15 | Second lens (Second group) |
| 4 | 107.876 | 2.00 | 1.62004 | 36.26 | Third lens (Second group) |
| 5 | 14.866 | 6.99 | | | |
| 6 | 0.0 | 11.05 | | | Diaphragm |
| 7 | −13.637 | 2.00 | 1.69895 | 30.12 | Fourth lens (Third group) |
| 8 | −26.019 | 3.96 | 1.71300 | 53.84 | Fifth lens (Third group) |
| 9 | −19.389 | 0.20 | | | |
| 10 | −137.969 | 5.14 | 1.71300 | 53.84 | Sixth lens (Fourth group) |
| 11 | −30.883 | | | | |
| 12 | 0.0 | 1.0 | 1.51633 | 64.15 | CCD cover glass |
| 13 | 0.0 | | | | |

Values corresponding to conditional expressions are as follows:

$n_2=1.516$ (1)

$v_2=64.2$ (2)

$n_3=1.620$ (3)

$v_3=36.3$ (4)

$v_2-v_3=27.9$ (5)

$(R_3+R_5)/R_4=0.341$ (6)

$(D_5+D_6)/f=0.265$ (7)

$f_1/f=0.826$ (8)

$f_4/f=0.799$ (9)

$(n_5+n_6)/2=1.713$ (10)

$(n_5+n_6)/2-n_4=0.014$ (11)

$(v_5+v_6)/2v_4=23.72$ (12)

$(R_7+R_9)/R_8=1.269$ (13)

$(R_5+|R_7|)/(D_5+D_6)=1.580$ (14)

$(R_3+|R_9|)/(D_3+D_4+D_5+D_6+D_7+D_8)=1.331$ (15)

$f_{12}/f=1.553$ (16)

$f_{34}/f=1.064$ (17)

$D_5/D_6=0.633$ (18)

FIG. 1 shows an optical arrangement of the Gauss lens according to the first preferred embodiment described above. FIG. 2 shows the aberration of the Gauss lens according to the first preferred embodiment.

Preferred Embodiment 2
F/No.=4.0
$F_e$=68.1 mm
m=0.16535
Y=152.4 mm
w=17.6°

| Surface number | R | D | $N_d$ | $v_d$ | Note |
|---|---|---|---|---|---|
| 1 | 27.023 | 5.18 | 1.71300 | 53.84 | First lens (First group) |
| 2 | 71.884 | 0.51 | | | |
| 3 | 21.034 | 4.99 | 1.51633 | 64.15 | Second lens (Second group) |
| 4 | 69.205 | 2.00 | 1.62004 | 36.26 | Third lens (Second group) |
| 5 | 14.511 | 7.28 | | | |
| 6 | 0.0 | 10.81 | | | Diaphragm |
| 7 | −14.008 | 2.00 | 1.68893 | 31.08 | Fourth lens (Third group) |
| 8 | −31.797 | 4.22 | 1.71300 | 53.84 | Fifth lens (Third group) |
| 9 | −20.196 | 0.20 | | | |
| 10 | −135.746 | 5.04 | 1.71300 | 53.84 | Sixth lens (Fourth group) |
| 11 | −31.151 | | | | |
| 12 | 0.0 | 1.0 | 1.51633 | 64.15 | CCD cover glass |
| 13 | 0.0 | | | | |

Values corresponding to conditional expressions are as follows:

$n_2=1.516$ (1)

$v_2=64.2$ (2)

$n_3=1.620$ (3)

$v_3=36.3$ (4)

$v_2-v_3=27.9$ (5)

$(R_3+R_5)/R_4=0.514$ (6)

$(D_5+D_6)/f=0.266$ (7)

$f_1/f=0.848$ (8)

$f_4/f=0.813$ (9)

$(n_5+n_6)/2=1.713$ (10)

$(n_5+n_6)/2-n_4=0.024$ (11)

$(v_5+v_6)/2v_4=22.76$ (12)

$(R_7+R_9)/R_8=1.076$ (13)

$(R_5+|R_7|)/(D_5+D_6)=1.577$ (14)

$(R_3+|R_9|)/(D_3+D_4+D_5+D_6+D_7+D_8)=1.317$ (15)

$f_{12}/f=1.553$ (16)

$f_{34}/f=1.081$ (17)

$D_5/D_6=0.673$ (18)

The optical arrangement of the Gauss lens according to the second preferred embodiment is preferably the same as the arrangement shown in FIG. 1. FIG. 3 shows the aberration of the Gauss lens according to the second preferred embodiment.

Preferred Embodiment 3
F/No.=4.0
F=68.1 mm
m=0.16535
Y=152.4 mm
w=17.6°

| Surface number | R | D | $N_d$ | $v_d$ | Note |
|---|---|---|---|---|---|
| 1 | 26.961 | 5.21 | 1.71300 | 53.84 | First lens (First group) |
| 2 | 74.315 | 1.18 | | | |
| 3 | 21.882 | 4.94 | 1.51633 | 64.15 | Second lens (Second group) |
| 4 | 98.910 | 2.00 | 1.62004 | 36.26 | Third lens (Second group) |
| 5 | 14.840 | 6.79 | | | |
| 6 | 0.0 | 10.77 | | | Diaphragm |
| 7 | −13.633 | 2.00 | 1.67270 | 32.10 | Fourth lens (Third group) |
| 8 | −32.540 | 4.12 | 1.71300 | 53.84 | Fifth lens (Third group) |
| 9 | −19.874 | 0.24 | | | |
| 10 | −137.015 | 5.20 | 1.69680 | 55.53 | Sixth lens (Fourth group) |
| 11 | −30.397 | | | | |
| 12 | 0.0 | 1.0 | 1.51633 | 64.15 | CCD cover glass |
| 13 | 0.0 | | | | |

Values corresponding to conditional expressions are as follows:

$$n_2 = 1.516 \tag{1}$$

$$v_2 = 64.2 \tag{2}$$

$$n_3 = 1.620 \tag{3}$$

$$v_3 = 36.3 \tag{4}$$

$$v_2 - v_3 = 27.9 \tag{5}$$

$$(R_3 + R_5)/R_4 = 0.371 \tag{6}$$

$$(D_5 + D_6)/f = 0.258 \tag{7}$$

$$f_1/f = 0.830 \tag{8}$$

$$f_4/f = 0.804 \tag{9}$$

$$(n_5 + n_6)/2 = 1.705 \tag{10}$$

$$(n_5 + n_6)/2 - n_4 = 0.032 \tag{11}$$

$$(v_5 + v_6)/2v_4 = 22.59 \tag{12}$$

$$(R_7 + R_9)/R_8 = 1.030 \tag{13}$$

$$(R_5 + |R_7|)/(D_5 + D_6) = 1.621 \tag{14}$$

$$(R_3 + |R_9|)/(D_3 + D_4 + D_5 + D_6 + D_7 + D_8) = 1.364 \tag{15}$$

$$f_{12}/f = 1.560 \tag{16}$$

$$f_{34}/f = 1.061 \tag{17}$$

$$D_5/D_6 = 0.630 \tag{18}$$

The optical arrangement of the Gauss lens according to the third preferred embodiment is preferably the same as the arrangement shown in FIG. 1. FIG. 4 shows the aberration of the Gauss lens according to the third preferred embodiment.

According to the first aspect of preferred embodiments of the present invention, if the above conditional expressions (1) through (9) are satisfied, when the Gauss lens is used with the imaging magnification of about 0.16535, a high reading density is achieved. For example, if the CCD has a pixel size of 7 μm, a resolution of 600 dpi is obtained. Furthermore, since it is possible to provide a reading lens having a sufficient angle of view of over 35° and a sufficient brightness of the F number of 4 at low cost, it is possible to provide a low price, high image quality digital copier, facsimile machine or similar device including a manuscript reading unit having the inventive reading lens.

According to the second aspect of preferred embodiments of the present invention, since the above conditional expressions (10) through (13) are preferably satisfied to achieve the lower-cost reading lens, it is possible to provide a lower-priced, high image quality digital copier, facsimile or similar device including a manuscript reading unit having the inventive reading lens.

According to the third aspect of preferred embodiments of the present invention, since the above conditional expressions (14) and (15) are preferably satisfied to achieve the reading lens having a higher imaging performance, it is possible to provide an even higher image quality digital copier, facsimile machine or similar device including a manuscript reading unit having the inventive reading lens.

According to the fourth aspect of preferred embodiments of the present invention, since the above conditional expressions (16) and (17) are preferably satisfied to achieve the reading lens having a lower curvature aberration, it is possible to contribute to the reduction of magnification error of the higher image quality digital copier, facsimile machine or similar device including a manuscript reading unit having the inventive reading lens.

According to the fifth aspect of preferred embodiments of the present invention, since the above conditional expression (18) is preferably satisfied to achieve the reading lens having the smaller outer diameter thereof, it is possible to contribute to a miniaturization of the higher image quality digital copier, facsimile machine or similar device including a manuscript reading unit having the inventive reading lens.

While the invention has been shown and described with reference to preferred embodiments thereof, it will be understood by those of skill in the art that the foregoing and other changes in form and details may be made therein without departing from the spirit and scope of the invention.

What is claimed is:

1. A Gauss lens comprising:
    a first lens group having a positive refracting power;
    a second lens group having a negative refracting power;
    a diaphragm;
    a third lens group having a negative refracting power; and
    a fourth lens group having a positive refracting power; wherein
    said first lens group, said second lens group, said diaphragm, said third lens group and said fourth lens group are arranged in this order from an object side;
    said first lens group including a first lens having a positive meniscus shape and including a convex surface directed toward the object side;
    said second lens group including:
        a second lens having a positive meniscus shape and including a convex surface directed toward the object side; and
        a third lens having a negative meniscus shape and including a concave surface directed toward an image side;
        said second lens and said third lens being connected to each other;
    said third lens group including:
        a fourth lens having a negative meniscus shape and including a concave surface directed toward the object side; and a fifth lens having a positive meniscus shape and including a convex surface directed toward the image;

said fourth lens and said fifth lens being connected to each other; and said fourth lens group including a sixth lens having a positive meniscus shape and including a convex surface directed toward the image; wherein assuming that:

$n_2$ denotes a refractive index of said second lens;

$n_3$ denotes the refractive index of said third lens;

$v_2$ denotes an Abbe number of said second lens;

$v_3$ denotes the Abbe number of said third lens;

$R_3$ denotes a radius of curvature of the surface of said second lens on the object side;

$R_4$ denotes the radius of curvature of the surface of said second lens on the image side;

$R_5$ denotes the radius of curvature of the surface of said third lens on the image side;

$D_5$ denotes an air space between the surface of said third lens on the image side and said diaphragm;

$D_6$ denotes the air space between said diaphragm and the surface of said fourth lens on the object side;

f denotes a focal length of a whole lens system;

$f_1$ denotes the focal length of said first lens group; and $f_4$ denotes the focal length of said fourth lens group; the following conditions (1) through (5) are satisfied:

$$n_2 < 1.53 \tag{1}$$

$$v_2 < 66.0 \tag{2}$$

$$n_3 < 1.63 \tag{3}$$

$$v_3 < 38.0 \tag{4}$$

$$25.0 < v_2 - v_3 < 35.0. \tag{5}$$

2. The Gauss lens according to claim 1, wherein the following conditions (6) through (9) are satisfied:

$$0.30 < (R_3 + R_5)/R_4 < 0.60 \tag{6}$$

$$0.24 < (D_5 + D_6)/f < 0.28 \tag{7}$$

$$0.80 < f_1/f < 0.87 \tag{8}$$

$$0.77 < f_4/f < 0.84. \tag{9}$$

3. The Gauss lens according to claim 1, wherein assuming that:

$n_4$ denotes the refractive index of said fourth lens;

$n_5$ denotes the refractive index of said fifth lens;

$n_6$ denotes the refractive index of said sixth lens;

$v_4$ denotes the Abbe number of said fourth lens;

$v_5$ denotes the Abbe number of said fifth lens;

$v_6$ denotes the Abbe number of said sixth lens;

$R_7$ denotes the radius of curvature of the surface of said fourth lens on the object side;

$R_8$ denotes the radius of curvature of the surface of said fourth lens on the image side; and $R_9$ denotes the radius of curvature of the surface of said fifth lens on the image side;

the following conditions (10) through (13) are satisfied:

$$(n_5 + n_6)/2 < 1.75 \tag{10}$$

$$0.00 < (n_5 + n_6)/2 - n_4 < 0.05 \tag{11}$$

$$20.0 < (v_5 + v_6)/2 - v_4 < 25.0 \tag{12}$$

$$1.00 < (R_7 + R_9)/R_8 < 1.30. \tag{13}$$

4. The Gauss lens according to claim 1, wherein assuming that:

$D_3$ denotes a center thickness of said second lens;

$D_4$ denotes a center thickness of said third lens;

$D_7$ denotes a center thickness of said fourth lens;

$D_8$ denotes a center thickness of said fifth lens;

the following conditions (14) and (15) are satisfied:

$$1.55 < (R_5 + |R_7|)/(D_5 + D_6) < 1.65 \tag{14}$$

$$1.28 < (R_3 + |R_9|)/(D_3 + D_4 + D_5 + D_6 + D_7 + D_8) < 1.40. \tag{15}$$

5. The Gauss lens according to claim 1, wherein assuming that:

$f_{12}$ denotes a synthetic focal length of said first lens group and said second lens group; and $f_{34}$ denotes a synthetic focal length of said third lens group and said fourth lens group;

the following conditions (16) and (17) are satisfied:

$$1.50 < f_{12}/f < 1.60 \tag{16}$$

$$1.05 < f_{34}/f < 1.15. \tag{17}$$

6. The Gauss lens according to claim 1, wherein the following condition (18) is satisfied:

$$0.60 < D_5/D_6 < 0.70. \tag{18}$$

7. An image scanner comprising:

a first lens group having a positive refracting power;

a second lens group having a negative refracting power;

a diaphragm;

a third lens group having a negative refracting power; and a fourth lens group having a positive refracting power; wherein said first lens group, said second lens group, said diaphragm, said third lens group and said fourth lens group are arranged in this order from an object side;

said first lens group including a first lens having a positive meniscus shape and including a convex surface directed toward the object side;

said second lens group including:

a second lens having a positive meniscus shape and including a convex surface directed toward the object side; and a third lens having a negative meniscus shape and including a concave surface directed toward an image side;

said second lens and said third lens being connected to each other;

said third lens group including:

a fourth lens having a negative meniscus shape and including a concave surface directed toward the object side; and a fifth lens having a positive meniscus shape and including a convex surface directed toward the image;

said fourth lens and said fifth lens being connected to each other; and said fourth lens group including a sixth lens having a positive meniscus shape and including a convex surface directed toward the image; wherein assuming that:
- $n_2$ denotes a refractive index of said second lens;
- $n_3$ denotes the refractive index of said third lens;
- $v_2$ denotes an Abbe number of said second lens;
- $v_3$ denotes the Abbe number of said third lens;
- $R_3$ denotes a radius of curvature of the surface of said second lens on the object side;
- $R_4$ denotes the radius of curvature of the surface of said second lens on the image side;
- $R_5$ denotes the radius of curvature of the surface of said third lens on the image side;
- $D_5$ denotes an air space between the surface of said third lens on the image side and said diaphragm;
- $D_6$ denotes the air space between said diaphragm and the surface of said fourth lens on the object side;
- $f$ denotes a focal length of a whole lens system;
- $f_1$ denotes the focal length of said first lens group; and
- $f_4$ denotes the focal length of said fourth lens group; the following conditions (1) through (5) are satisfied:

$$n_2 < 1.53 \tag{1}$$
$$v_2 < 66.0 \tag{2}$$
$$n_3 < 1.63 \tag{3}$$
$$v_3 < 38.0 \tag{4}$$
$$25.0 < v_2 - v_3 < 35.0. \tag{5}$$

8. The image scanner according to claim 7, wherein the following conditions (6) through (9) are satisfied:

$$0.30 < (R_3 + R_5)/R_4 < 0.60 \tag{6}$$
$$0.24 < (D_5 + D_6)/f < 0.28 \tag{7}$$
$$0.80 < f_1/f < 0.87 \tag{8}$$
$$0.77 < f_4/f < 0.84. \tag{9}$$

9. The image scanner according to claim 7, wherein assuming that:
- $n_4$ denotes the refractive index of said fourth lens;
- $n_5$ denotes the refractive index of said fifth lens;
- $n_6$ denotes the refractive index of said sixth lens;
- $v_4$ denotes the Abbe number of said fourth lens;
- $v_5$ denotes the Abbe number of said fifth lens;
- $v_6$ denotes the Abbe number of said sixth lens;
- $R_7$ denotes the radius of curvature of the surface of said fourth lens on the object side;
- $R_8$ denotes the radius of curvature of the surface of said fourth lens on the image side; and
- $R_9$ denotes the radius of curvature of the surface of said fifth lens on the image side;

the following conditions (10) through (13) are satisfied:

$$(n_5 + n_6)/2 < 1.75 \tag{10}$$
$$0.00 < (n_5 + n_6)/2 - n_4 < 0.05 \tag{11}$$
$$20.0 < (v_5 + v_6)/2 - v_4 < 25.0 \tag{12}$$
$$1.00 < (R_7 + R_9)/R_8 < 1.30. \tag{13}$$

10. The image scanner according to claim 7, wherein assuming that:
- $D_3$ denotes a center thickness of said second lens;
- $D_4$ denotes a center thickness of said third lens;
- $D_7$ denotes a center thickness of said fourth lens;
- $D_8$ denotes a center thickness of said fifth lens;

the following conditions (14) and (15) are satisfied:

$$1.55 < (R_5 + |R_7|)/(D_5 + D_6) < 1.65 \tag{14}$$
$$1.28 < (R_3 + |R_9|)/(D_3 + D_4 + D_5 + D_6 + D_7 + D_8) < 1.40. \tag{15}$$

11. The image scanner according to claim 7, wherein assuming that:
- $f_{12}$ denotes a synthetic focal length of said first lens group and said second lens group; and
- $f_{34}$ denotes a synthetic focal length of said third lens group and said fourth lens group;

the following conditions (16) and (17) are satisfied:

$$1.50 < f_{12}/f < 1.60 \tag{16}$$
$$1.05 < f_{34}/f < 1.15. \tag{17}$$

12. The image scanner according to claim 7, wherein the following condition (18) is satisfied:

$$0.60 < D_5/D_6 < 0.70. \tag{18}$$

13. An image forming apparatus comprising:
- a first lens group having a positive refracting power;
- a second lens group having a negative refracting power;
- a diaphragm;
- a third lens group having a negative refracting power; and
- a fourth lens group having a positive refracting power; wherein
- said first lens group, said second lens group, said diaphragm, said third lens group and said fourth lens group are arranged in this order from an object side;
- said first lens group including a first lens having a positive meniscus shape and including a convex surface directed toward the object side;
- said second lens group including:
  - a second lens having a positive meniscus shape and including a convex surface directed toward the object side; and
  - a third lens having a negative meniscus shape and including a concave surface directed toward an image side;
  - said second lens and said third lens being connected to each other;
- said third lens group including:
  - a fourth lens having a negative meniscus shape and including a concave surface directed toward the object side; and
  - a fifth lens having a positive meniscus shape and including a convex surface directed toward the image;
  - said fourth lens and said fifth lens being connected to each other; and
- said fourth lens group including a sixth lens having a positive meniscus shape and including a convex surface directed toward the image; wherein assuming that:
- $n_2$ denotes a refractive index of said second lens;
- $n_3$ denotes the refractive index of said third lens;
- $v_2$ denotes an Abbe number of said second lens;
- $v_3$ denotes the Abbe number of said third lens;
- $R_3$ denotes a radius of curvature of the surface of said second lens on the object side;

$R_4$ denotes the radius of curvature of the surface of said second lens on the image side;

$R_5$ denotes the radius of curvature of the surface of said third lens on the image side;

$D_5$ denotes an air space between the surface of said third lens on the image side and said diaphragm;

$D_6$ denotes the air space between said diaphragm and the surface of said fourth lens on the object side;

f denotes a focal length of a whole lens system;

$f_1$ denotes the focal length of said first lens group; and $f_4$ denotes the focal length of said fourth lens group; the following conditions (1) through (5) are satisfied:

$$n_2 < 1.53 \tag{1}$$

$$v_2 < 66.0 \tag{2}$$

$$n_3 < 1.63 \tag{3}$$

$$v_3 < 38.0 \tag{4}$$

$$25.0 < v_2 - v_3 < 35.0. \tag{5}$$

14. The image forming apparatus according to claim 13, wherein the following conditions (6) through (9) are satisfied:

$$0.30 < (R_3 + R_5)/R_4 < 0.60 \tag{6}$$

$$0.24 < (D_5 + D_6)/f < 0.28 \tag{7}$$

$$0.80 < f_1/f < 0.87 \tag{8}$$

$$0.77 < f_4/f < 0.84. \tag{9}$$

15. The image scanning apparatus according to claim 13, wherein assuming that:

$n_4$ denotes the refractive index of said fourth lens;

$n_5$ denotes the refractive index of said fifth lens;

$n_6$ denotes the refractive index of said sixth lens;

$v_4$ denotes the Abbe number of said fourth lens;

$v_5$ denotes the Abbe number of said fifth lens;

$v_6$ denotes the Abbe number of said sixth lens;

$R_7$ denotes the radius of curvature of the surface of said fourth lens on the object side;

$R_8$ denotes the radius of curvature of the surface of said fourth lens on the image side; and $R_9$ denotes the radius of curvature of the surface of said fifth lens on the image side;

the following conditions (10) through (13) are satisfied:

$$(n_5 + n_6)/2 < 1.75 \tag{10}$$

$$0.00 < (n_5 + n_6)/2 - n_4 < 0.05 \tag{11}$$

$$20.0 < (v_5 + v_6)/2 - v_4 < 25.0 \tag{12}$$

$$1.00 < (R_7 + R_9)/R_8 < 1.30. \tag{13}$$

16. The image scanning apparatus according to claim 13, wherein assuming that:

$D_3$ denotes a center thickness of said second lens;

$D_4$ denotes a center thickness of said third lens;

$D_7$ denotes a center thickness of said fourth lens;

$D_8$ denotes a center thickness of said fifth lens;

the following conditions (14) and (15) are satisfied:

$$1.55 < (R_5 + |R_7|)/(D_5 + D_6) < 1.65 \tag{14}$$

$$1.28 < (R_3 + |R_9|)/(D_3 + D_4 + D_5 + D_6 + D_7 + D_8) < 1.40. \tag{15}$$

17. The image scanning apparatus according to claim 13, wherein assuming that:

$f_{12}$ denotes a synthetic focal length of said first lens group and said second lens group; and $f_{34}$ denotes a synthetic focal length of said third lens group and said fourth lens group;

the following conditions (16) and (17) are satisfied:

$$1.50 < f_{12}/f < 1.60 \tag{16}$$

$$1.05 < f_{34}/f < 1.15. \tag{17}$$

18. The image scanning apparatus according to claim 13, wherein the following condition (18) is satisfied:

$$0.60 < D_5/D_6 < 0.70. \tag{18}$$

19. A method of making a Gauss lens comprising the steps of:

forming a first lens group having a positive refracting power;

forming a second lens group having a negative refracting power;

forming a diaphragm;

forming a third lens group having a negative refracting power; and forming a fourth lens group having a positive refracting power; wherein said first lens group, said second lens group, said diaphragm, said third lens group and said fourth lens group are arranged in this order from an object side;

said first lens group including a first lens having a positive meniscus shape and including a convex surface directed toward the object side;

said second lens group including:

a second lens having a positive meniscus shape and including a convex surface directed toward the object side; and a third lens having a negative meniscus shape and including a concave surface directed toward an image side;

said second lens and said third lens being connected to each other;

said third lens group including:

a fourth lens having a negative meniscus shape and including a concave surface directed toward the object side; and a fifth lens having a positive meniscus shape and including a convex surface directed toward the image;

said fourth lens and said fifth lens being connected to each other; and said fourth lens group including a sixth lens having a positive meniscus shape and including a convex surface directed toward the image; wherein assuming that:

$n_2$ denotes a refractive index of said second lens;

$n_3$ denotes the refractive index of said third lens;

$v_2$ denotes an Abbe number of said second lens;

$v_3$ denotes the Abbe number of said third lens;

$R_3$ denotes a radius of curvature of the surface of said second lens on the object side;

$R_4$ denotes the radius of curvature of the surface of said second lens on the image side;

$R_5$ denotes the radius of curvature of the surface of said third lens on the image side;

$D_5$ denotes an air space between the surface of said third lens on the image side and said diaphragm;

$D_6$ denotes the air space between said diaphragm and the surface of said fourth lens on the object side;

f denotes a focal length of a whole lens system;

$f_1$ denotes the focal length of said first lens group; and $f_4$ denotes the focal length of said fourth lens group; the following conditions (1) through (5) are satisfied:

$$n_2 < 1.53 \tag{1}$$

$$v_2 < 66.0 \tag{2}$$

$$n_3 < 1.63 \tag{3}$$

$$v_3 < 38.0 \tag{4}$$

$$25.0 < v_2 - v_3 < 35.0. \tag{5}$$

20. The method according to claim 19, wherein the following conditions (6) through (9) are satisfied:

$$0.30 < (R_3 + R_5)/R_4 < 0.60 \tag{6}$$

$$0.24 < (D_5 + D_6)/f < 0.28 \tag{7}$$

$$0.80 < f_1/f < 0.87 \tag{8}$$

$$0.77 < f_4/f < 0.84. \tag{9}$$

21. The method according to claim 19, wherein assuming that:

$n_4$ denotes the refractive index of said fourth lens;

$n_5$ denotes the refractive index of said fifth lens;

$n_6$ denotes the refractive index of said sixth lens;

$v_4$ denotes the Abbe number of said fourth lens;

$v_5$ denotes the Abbe number of said fifth lens;

$v_6$ denotes the Abbe number of said sixth lens;

$R_7$ denotes the radius of curvature of the surface of said fourth lens on the object side;

$R_8$ denotes the radius of curvature of the surface of said fourth lens on the image side; and $R_9$ denotes the radius of curvature of the surface of said fifth lens on the image side;

the following conditions (10) through (13) are satisfied:

$$(n_5 + n_6)/2 < 1.75 \tag{10}$$

$$0.00 < (n_5 + n_6)/2 - n_4 < 0.05 \tag{11}$$

$$20.0 < (v_5 + v_6)/2 - v_4 < 25.0 \tag{12}$$

$$1.00 < (R_7 + R_9)/R_8 < 1.30. \tag{13}$$

22. The method according to claim 19, wherein assuming that:

$D_3$ denotes a center thickness of said second lens;

$D_4$ denotes a center thickness of said third lens;

$D_7$ denotes a center thickness of said fourth lens;

$D_8$ denotes a center thickness of said fifth lens;

the following conditions (14) and (15) are satisfied:

$$1.55 < (R_5 + |R_7|)/(D_5 + D_6) < 1.65 \tag{14}$$

$$1.28 < (R_3 + |R_9|)/(D_3 + D_4 + D_5 + D_6 + D_7 + D_8) < 1.40. \tag{15}$$

23. The method according to claim 19, wherein assuming that:

$f_{12}$ denotes a synthetic focal length of said first lens group and said second lens group; and $f_{34}$ denotes a synthetic focal length of said third lens group and said fourth lens group;

the following conditions (16) and (17) are satisfied:

$$1.50 < f_{12}/f < 1.60 \tag{16}$$

$$1.05 < f_{34}/f < 1.15. \tag{17}$$

24. The method according to claim 19, wherein the following condition (18) is satisfied:

$$0.60 < D_5/D_6 < 0.70. \tag{18}$$

* * * * *